3,429,717
FLEXIBLE FILM WRAPPER
John M. Cook, Greenville, S.C., assignor to W. R. Grace & Co., Duncan, S.C., a corporation of Connecticut
No Drawing. Filed May 24, 1965, Ser. No. 458,387
U.S. Cl. 99—171    6 Claims
Int. Cl. A23l 3/00; B32b 27/18, 33/00

ABSTRACT OF THE DISCLOSURE

A multi-ply film structure made by distributing a mixture of antioxidant and solvent between two adjacent intimately associated film layers. The film is used to package food.

---

This invention relates to a flexible film wrapper. In one aspect, the invention relates to a multiple ply film structure having improved oxygen protective properties. In another aspect, the invention relates to a method for imparting improved oxidative retardation properties to flexible film wrapping materials.

It is now well known to employ a multitude of transparent flexible film wrapping materials, including thermoplastic polymeric films, for wrapping articles such as foodstuffs. These packages may be sealed, such as by heat-sealing the thermoplastic film, so as to provide a relatively airtight package or a seal may be provided to produce a hermetically sealed package. These films, particularly those that have the additional property of being heat-shrinkable, not only provide good protection for the articles, but also due to their transparency, etc. provide good appearance. However, these different polymeric materials possess different inherent characteristics such as flexibility, sealibility, gas permeability and shrinking properties. A film may possess all the necessary properties for a particular application, but be deficient in gas permeability. This is particularly important in the packaging of food products which are susceptable to oxidative spoilage due to oxygen permeating the film from the atmosphere.

It is known to incorporate antioxidant materials within the polymeric substance as well as to coat the film with a substance which retards the oxidative influence. It has also been proposed to employ laminates with one lamina having a lower oxygen permeability so as to produce the desired properties. None of the proposed methods offer the advantages of the present invention.

It is an object of the invention to provide a novel thermoplastic film.

It is another object of the invention to provide a multiple ply film structure having improved oxidative inhibitive properties.

Still another object is to provide a method for decreasing the oxygen permeability of a thermoplastic film.

Still another object is to provide a package with improved oxidative protection for the articles contained therein. These and other objects of the invention will be readily apparent to those skilled in the art from the following disclosure and appended claims.

Surprisingly, it has now been found that if an antioxidant dissolved in a solvent therefor is uniformly distributed between two layers of intimately associated film the permeability of the film to oxygen is greatly reduced. In addition, there is no direct contact between the wrapped product, e.g. food, and the antioxidant and solvent.

Thus, a food item normally susceptible to oxidative influences such as oxygen, air, ozone, etc., can be wrapped in a multiple ply film structure of this invention and will afford a much greater shelf life. Why this procedure and structure provide a reduced oxygen permeability compared to film having an antioxidant incorporated therein or a film coated with a solution containing antioxidant is not understood, although it is thought to be related to the fact that the antioxidant is contained within an oxygen-free atmosphere.

The invention is broadly applicable to thermoplastic polymeric film incluuding, but not limited to, polymers of alpha olefins, such as polyethylene, polypropylene, polybutene and the like, the polyvinyls, the vinylidene chloride polymers including Saran, the polyamides such as nylon and the like. A particularly suitable film is a Saran film, particularly a transparent biaxially oriented film prepared from a copolymer of vinylidene chloride with vinyl chloride or acrylonitrile or the like. The term polymer as employed herein includes homopolymers, copolymers, block polymers, random polymers, graft polymers and laminates of different polymers. For simplicity, the invention is described with reference to a two-ply film structure although the invention is broadly applicable to a multiple ply film structure with an antioxidant distributed between at least two intimately associated layers of film. For example, a three-ply structure could be employed with two layers of Saran with the antioxidant between said layers and a third layer of nylon or polyethylene bonded or otherwise laminated to one of the Saran layers.

Any antioxidant may be employed which is compatible with the thermoplastic film with which it is in contact. Antioxidants which may be employed include the phenols, aromatic amines, aminophenols and their salts, condensation products of amines with aldehydes and ketones and thio- compounds (mercaptans, thiophenols, sulfides, etc.). The particular antioxidant employed depends not only on the film but also on the product contained within the film and on the light and the heating conditions to which the package is to be exposed and the like. Particularly useful and effective antioxidants include, but are not limited to, butylated hydroxyanisole, butylated hydroxytoluene, dihydroxymaleic acid, gualac, guaiacic acid, mor-dihydroguaiaretic acid, n-propyl gallate and 3,3'-thiodipropionic acid. A particularly preferred antioxidant is n-propyl gallate.

The antioxidant is uniformly distributed between the two layers of film in any suitable solvent for the antioxidant. The solvent must be inert to the film and have low volatility at the temperatures to which the film is subjected. Suitable solvents include propylene glycol, ethylene glycol, glycerine, and oils such as mineral oils, cottonseed oil, peanut oil and the like. A sufficient amount of antioxident must dissolve in the solvent so that the space between the film layers contains sufficient antioxidant and solvent to reduce the oxygen permeability of the film. Although the mechanism is not understood, the decrease in oxygen permeability is greater than would be predicted from the known oxygen reactive characteristics of the antioxidant by itself or by the oxygen absorption characteristics of the solvent by itself.

The antioxidant and solvent therefor is distributed between two layers of film by any suitable means. For example, the antioxidant is dissolved in a suitable solvent and one surface of a film coated with the solution. This coated surface is then brought into contact with the second layer of film thereby entrapping the antioxidant and the solvent between the two layers of film. A particularly desirable method of accomplishing this objective is to dissolve the antioxidant in propylene glycol or other lubricating fluid and then employ this admixture as the "sock" during the forming of the polymer film. For example, the polymer is extruded through an annular die to form a tubing which is then passed downwardly into a cold water bath, withdrawn, reheated and then biaxially oriented such as by stretching or by blowing a bubble. A pair of nip rolls is employed in or adjacent to the cold water bath with a liquid known as a "sock" trapped within the interior of the freshly extruded tubing to prevent the internal walls from adhering to each other. Although the nip rolls prevent any substantial carry over of liquid from the sock there is some wetting of the interior surfaces. Thus, this method provides a convenient method for depositing a very thin, almost monomolecular, layer of antioxidant-solvent mixture on the contacting film surfaces. If this tubing after orientation is trimmed at the edges and wound on a roll, a two-ply structure is formed, known as double wound film, with an antioxidant-solvent mixture between the two layers.

Preferably the amount of antioxidant and solvent between the two layers of film is evenly distributed and sufficient to reduce the oxygen permeability of the film structure. Preferably, about 10 to 100 milligrams/ft.$^2$ of antioxidant-solvent mixture, or 1 to 30 mg./ft.$^2$ of antioxidant is uniformly deposited between the two layers of film. When the antioxidant and solvent are deposited by the sock method described above, the antioxidant is present in the sock mixture in an amount ranging from 0.1 to 30 weight percent, preferably 0.5 to 15 weight percent based on the combined weights of the antioxidant and solvent. The solvent constitutes substantially all of the remaining sock composition. A particularly suitable lubricant and solvent for the antioxidant is propylene glycol.

The invention has particular usefulness in the packaging of cheese or other foods containing fats and oils. Cheese, for example, is packaged in a variety of shapes and sizes ranging from small wedges or rounds to large 20, 40 and 60 pound blocks, all of which are susceptible to oxidative influences. These blocks of cheese have especially long shelf life if they are first placed in a double wound Saran film with an antioxidant-solvent mixture between the two layers and then passed into a cheese press wherein they are subjected to elevated temperatures to not only seal the overlapped edges of the Saran film, but to also shrink the film tightly about the blocks and in addition cause oiling-off of the surfaces of the cheese.

The invention is best illustrated by the following example. A double wound Saran film (polymer of polyvinylidene chloride and vinyl chloride) was prepared by extruding the polymer through an annular die downwardly into a cold water bath containing nip rolls. The sock within the interior of the tubing and above the nip rolls contained 500 gms. of n-propyl gallate per gallon of propylene glycol (12.6 weight percent). The quenched film was then reheated and biaxially oriented by blowing a bubble. The edges of the film were trimmed and the film rolled onto a roll to form a double wound film with the oxygen scavenger or antioxidant between the two layers. The retention of antioxidant-solvent mixture on the film was about 40 mg./ft.$^2$ or about 5 mg./ft.$^2$ of antioxidant. Another run was made identical to the above except that the biaxially oriented Saran was prepared without an antioxidant in the sock.

The permeability of the thus produced two-ply structures was then determined by placing film specimens in a sealed cell so that the film completely separated the upper and lower sections of the cell. The cell and contents were maintained at room temperature (73°±2° F.) throughout the test. A top section was purged with dry nitrogen overnight. Dry oxygen was introduced into a lower cell section and permitted to permeate through the film for a period of time ranging from about 20 days to 41 days. The mixture of nitrogen and oxygen in the top section was introduced into a Holdane-Henderson-Orsat gas analysis apparatus. The oxygen content of each sample was then determined. The film thickness of the sample was determined in mils with a micrometer. Oxygen transmission rate was determined in cc.'s per 24 hours per square meter per atmospheres. These values were then converted to a standard 1 mil thickness basis and are referred to in the following table as permeability rate.

TABLE I.—2-PLY SARAN WITHOUT ANTIOXIDANT

| Run No. | Transmission Time (hours) | Film Thickness, mils | Transmission Rate, cc. (24 hrs., meters$^2$, atm.) | Permeability Rate, cc. (1 mil, 24 hrs., meters$^2$, atm.) (calculated) |
| --- | --- | --- | --- | --- |
| 1 | 486 | 0.94 | 133 | 136 |
| 2 | 486⅔ | 0.93 | 123 | 126 |
| 3 | 486½ | 0.91 | 124 | 127 |
| 2-PLY SARAN WITH ANTIOXIDANT | | | | |
| 1 | 510 | 0.93 | 26 | 28 |
| 2 | 984 | 0.93 | 17 | 18 |
| 3 | 984¼ | 0.87 | 21 | 24 |
| 4 | 984¼ | 0.96 | 21 | 21 |

It will be readily seen from the above data that the oxygen permeability for two-ply Saran with an antioxidant-solvent trapped between the two plies is almost 6 fold less than the same material without the antioxidant-solvent mixture between the two plies. Theory, based on known reactivity of n-propyl gallate with oxygen, indicates that 54 mg./ft.$^2$ of n-propyl gallate would react chemically with only about 2–4 cc. of oxygen.

While certain examples, structures, composition and process steps have been described for purposes of illustration, the invention is not limited to these. Variation and modification within the scope of the disclosure and the claims can readily be effected by those skilled in the art.

I claim:
1. A package comprising a foodstuff subject to oxidative-type deterioration enclosed within a heat-sealed film structure, said structure comprising two layers of biaxially oriented film prepared from a polymer of vinylidene chloride and having n-propyl gallate and propylene glycol between the layers, said n-propyl gallate and propylene glycol being present in an amount sufficient to reduce the oxygen permeation through said layers of film.

2. A two-ply structure comprising two layers of thermoplastic polymeric film having deposited between each layer an antioxidant comprising n-propyl gallate and a solvent comprising propylene glycol for said antioxidant, the amount of said antioxidant and solvent being sufficient to provide a structure having a rate of oxygen permeability less than the rate of oxygen permeability of said structure without antioxidant.

3. A two ply structure comprising two adjacent intimately associated layers of thermoplastic biaxially oriented film of a polymer of vinylidene chloride; and a mixture consisting essentially of the antioxidant, n-propyl gallate, and the solvent, propylene glycol, said n-propyl gallate present in the mixture in an amount ranging from 0.1 to 30 weight percent based on the combined weights of the antioxidant and solvent; said mixture uniformly distributed between said two plies of adjacent intimately associated thermoplastic biaxially oriented film of a polymer of vinylidene chloride.

4. The structure of claim 3 wherein the n-propyl gallate antioxidant is present in the mixture in an amount ranging from 0.5 to 15 weight percent based on the combined weights of the antioxidant and solvent.

5. A method for reducing the oxygen permeability of film prepared from a polymer of vinylidene chloride comprising forming a two-ply film structure from said film and depositing a solution of n-propyl gallate in propylene glycol between said plies.

6. A method for reducing the oxygen permeability of film prepared from a polymer of vinylidene chloride comprising downwardly extruding said polymer through an annular die to form a tubing, cooling said tubing, pinching said tubing together, coating the interior walls of said tubing with a sock formulation containing antioxidant and propylene glycol, reheating said tubing, biaxially orienting said tubing to form film, and winding said film into a roll to form double wound film with antioxidant and propylene glycol between alternate layers of film.

References Cited

UNITED STATES PATENTS 2,979,410  4/1961  Parlour _____ 99—171
2,991,193  7/1961  Fessler et al. _____ 99—171 X A. LOUIS MONACELL, *Primary Examiner.*

S. B. DAVIS, *Assistant Examiner.*

U.S. Cl. X.R.

156—145, 307; 161—256, 402